US010222777B2

(12) United States Patent
Takahashi (10) Patent No.: US 10,222,777 B2
(45) Date of Patent: Mar. 5, 2019

(54) INPUT-OUTPUT DEVICE

(71) Applicant: Mitsubishi Electric Corporation, Tokyo (JP)

(72) Inventor: Masahiro Takahashi, Tokyo (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 0 days.

(21) Appl. No.: 15/532,375

(22) PCT Filed: Dec. 3, 2014

(86) PCT No.: PCT/JP2014/082045
§ 371 (c)(1),
(2) Date: Jun. 1, 2017

(87) PCT Pub. No.: WO2016/088229
PCT Pub. Date: Jun. 9, 2016

(65) Prior Publication Data
US 2017/0329300 A1  Nov. 16, 2017

(51) Int. Cl.
*G05B 19/05* (2006.01)
*G05B 19/10* (2006.01)
*G05B 19/042* (2006.01)

(52) U.S. Cl.
CPC ....... *G05B 19/054* (2013.01); *G05B 19/0423* (2013.01); *G05B 19/104* (2013.01); *G05B 2219/1105* (2013.01)

(58) Field of Classification Search
CPC ............................ G05B 19/054; G05B 19/104
(Continued)

(56) References Cited

U.S. PATENT DOCUMENTS 5,410,465 A * 4/1995 Tan .................. H02M 3/07
363/60
5,574,475 A * 11/1996 Callahan, Jr. ........ G09G 3/2011
345/100
(Continued)

FOREIGN PATENT DOCUMENTS

JP      5-100721 A     4/1993
JP    2005-302006 A   10/2005
(Continued)

OTHER PUBLICATIONS

International Search Report for PCT/JP2014/082045 dated Mar. 10, 2015 [PCT/ISA/210].
(Continued)

*Primary Examiner* — Paul R. Myers
(74) *Attorney, Agent, or Firm* — Sughrue Mion, PLLC; Richard C. Turner (57) ABSTRACT

An input-output device includes an input circuit unit including an input-signal-setting storing unit that stores a plurality of ON conditions of the input signal and an input circuit that determines whether any one of the ON conditions of the stored input signal holds, a computing unit including an output-signal-setting storing unit that stores information in which the ON conditions of the input signal, output ports for outputting an output signal, and specifications of the output signal are associated and an output-signal selecting unit that generates, on the basis of a determination result of the input circuit and the stored information, an output command indicating the output ports and the specifications of the output signal, and an output circuit unit including an output circuit that outputs, to the output ports indicated by the output command, the output signal according to the specifications indicated by the output command.

4 Claims, 5 Drawing Sheets

(58) Field of Classification Search
USPC .............................................. 363/74; 307/75
See application file for complete search history.

(56) References Cited

U.S. PATENT DOCUMENTS

| | | | | |
|---|---|---|---|---|
| 5,620,466 | A * | 4/1997 | Haefner | A61N 1/3704 607/5 |
| 5,838,578 | A * | 11/1998 | Pippin | G06F 1/206 327/512 |
| 6,144,357 | A * | 11/2000 | Jeong | G09G 3/3696 345/100 |
| 7,825,607 | B1 * | 11/2010 | Huang | H05B 33/0815 315/247 |
| 2005/0110463 | A1 * | 5/2005 | Patino | H02J 7/025 320/132 |
| 2005/0162019 | A1 * | 7/2005 | Masciarelli | H02J 9/062 307/66 |
| 2006/0256594 | A1 * | 11/2006 | Lam | H02M 7/5383 363/74 |
| 2007/0016337 | A1 | 1/2007 | Iwagami et al. | |
| 2010/0194793 | A1 * | 8/2010 | Uehara | G09G 3/20 345/691 |
| 2013/0070774 | A1 * | 3/2013 | Bankman | H04L 49/40 370/401 |
| 2013/0082673 | A1 * | 4/2013 | Sako | G05F 1/46 323/282 |
| 2014/0139122 | A1 * | 5/2014 | Valois | H05B 33/0851 315/165 |
| 2015/0108895 | A1 * | 4/2015 | Trinschek | H05B 33/0803 315/86 |

FOREIGN PATENT DOCUMENTS

| | | |
|---|---|---|
| JP | 2007-026058 A | 2/2007 |
| JP | 2010-237987 A | 10/2010 |
| JP | 2014-131726 A | 7/2014 |
| KR | 10-2014-0011242 A | 1/2014 |

OTHER PUBLICATIONS

Communication dated Oct. 22, 2018 from the Korean Intellectual Property Office in counterpart Application No. 10-2017-7014420.

* cited by examiner

INPUT-SIGNAL-SETTING STORING UNIT (112)

| ON 1 | VOLTAGE SETTING VALUE 10V OR MORE AND LESS THAN 15V |
|---|---|
| ON 2 | VOLTAGE SETTING VALUE 15V OR MORE AND LESS THAN 20V |

FIG.4

OUTPUT-SIGNAL-SETTING STORING UNIT (122)

| | OUTPUT PORT | SPECIFICATIONS OF OUTPUT SIGNAL |
|---|---|---|
| ON 1 | $Y_0$ | OUTPUT VOLTAGE 20V |
| ON 2 | $Y_2$ | OUTPUT VOLTAGE 28V |

| SIGNAL-SPECIFICATION-SETTING STORING UNIT |  |
|---|---|
| OUTPUT PORT | SPECIFICATIONS OF OUTPUT SIGNAL |
| $Y_0$ | OUTPUT VOLTAGE 20V |
| $Y_2$ | OUTPUT VOLTAGE 28V |

INPUT-OUTPUT DEVICE

CROSS REFERENCE TO RELATED APPLICATIONS

This application is a National Stage of International Application No. PCT/JP2014/082045, filed on Dec. 3, 2014, the contents of all which are incorporated herein by reference in their entirety.

FIELD

The present invention relates to an input-output device that outputs, according to ON or OFF of an input signal, different signals to an input device connected to the input-output device.

BACKGROUND

In an input-output device having a logical operation function for setting a signal, two states of ON and OFF of which are defined by voltage values, as an input signal and controlling an ON state and an OFF state of a plurality of outputs when the input signal is in the ON state, even if ON conditions of the input signal are defined by a plurality of voltage values, there is only one kind of a voltage condition defined on an input port side. Therefore, an output signal cannot be selected according to a difference in a voltage value of the input signal.

When the ON state and the OFF state of the output signal is selected according to the difference in the voltage value of the input signal, it is necessary to connect the input signal to a plurality of input ports having ON conditions under which the output signal can be recognized as ON at all of a plurality of voltage values of the input signal.

In an input-output device in which the input signal is connected to the plurality of input ports having the ON conditions under which the output signal can be recognized as ON at all of the plurality of voltage values of the input signal, when ON is detected in any one of the input ports divided from the input signal and connected, by controlling the ON state and the OFF state of the output signal from an output port set in advance, it is possible to select the output signal according to a difference in a voltage value of the input signal.

When the ON state and the OFF state of the output signal are selected according to a difference in a current value of the input signal, it is necessary to connect the input signal to a plurality of input ports having ON conditions under which the output signal can be recognized as ON at all of a plurality of current values of the input signal.

In an input-output device in which the input signal is connected to the plurality of input ports having the ON conditions under which the output signal can be recognized as ON at all of the plurality of voltage values of the input signal, when ON is detected in any one of the input ports divided from the input signal and connected, by controlling the ON state and the OFF state of the output signal from an output port set in advance, it is possible to select the output signal according to a difference in a current value of the input signal.

When the ON state and the OFF state of the output signal are selected according to a difference in an ON time of the input signal, in the same manner as when the ON state and the OFF state of the output signal are selected according to the difference in the voltage value or the current value, it is necessary to connect the input signal to a plurality of input ports having ON conditions under which the output signal can be recognized as ON at all of a plurality of ON times of the input signal.

Further, when the ON conditions of the input signal are defined by combinations of the voltage value, the current value, and the ON time, input ports as many as the number of combinations are necessary. It is necessary to connect the input signal to the input ports.

A technology for determining in which state an input signal having a plurality of states is in is disclosed in Patent Literature 1.

CITATION LIST

Patent Literature

Patent Literature 1: Japanese Patent Application Laid Open No. 2005-302006.

SUMMARY

Technical Problem

However, the technology disclosed in Patent Literature 1 described above does not include a function of controlling a plurality of ON states and a plurality of OFF states of an output signal according to a plurality of states of an input signal. Therefore, the output signal cannot be selected according to a difference in an ON state of the input signal.

The present invention has been devised in view of the above and an object of the present invention is to obtain an input-output device that can cope with a plurality of ON states of an input signal in one input port and control a plurality of ON states and a plurality of OFF states of an output signal on the basis of a type of an ON state of the input signal.

Solution to Problem

To solve the problems and achieve the object, the present invention provides an input-output device that receives an input signal from an output device connected to an input port and, when the input signal is in an ON state, outputs an output signal to any one of a plurality of input devices connected to a plurality of output ports. The input-output device includes: an input circuit unit including an input-signal-setting storing unit to store a plurality of ON conditions of the input signal and a determining unit to determine whether any one of the ON conditions of the input signal stored in the input-signal-setting storing unit holds; a computing unit including an output-signal-setting storing unit to store information in which the ON conditions of the input signal, the output ports for outputting the output signal, and specifications of the output signal are associated and an output-signal selecting unit to generate, on the basis of a determination result of the determining unit and the information stored in the output-signal-setting storing unit, an output command indicating the output ports for outputting the output signal and the specifications of the output signal; and an output circuit unit to output, to the output ports indicated by the output command, the output signal according to the specifications indicated by the output command.

Advantageous Effects of Invention

The input-output device according to the present invention achieves an effect that it is possible to cope with a plurality of ON states of an input signal in one input port and control a plurality of ON states and a plurality of OFF states of an output signal on the basis of a type of an ON state of the input signal.

DESCRIPTION OF EMBODIMENTS

Input-output devices according to embodiments of the present invention are explained in detail below with reference to the drawings. Note that the present invention is not limited by the embodiments.

First Embodiment

Figure 1:
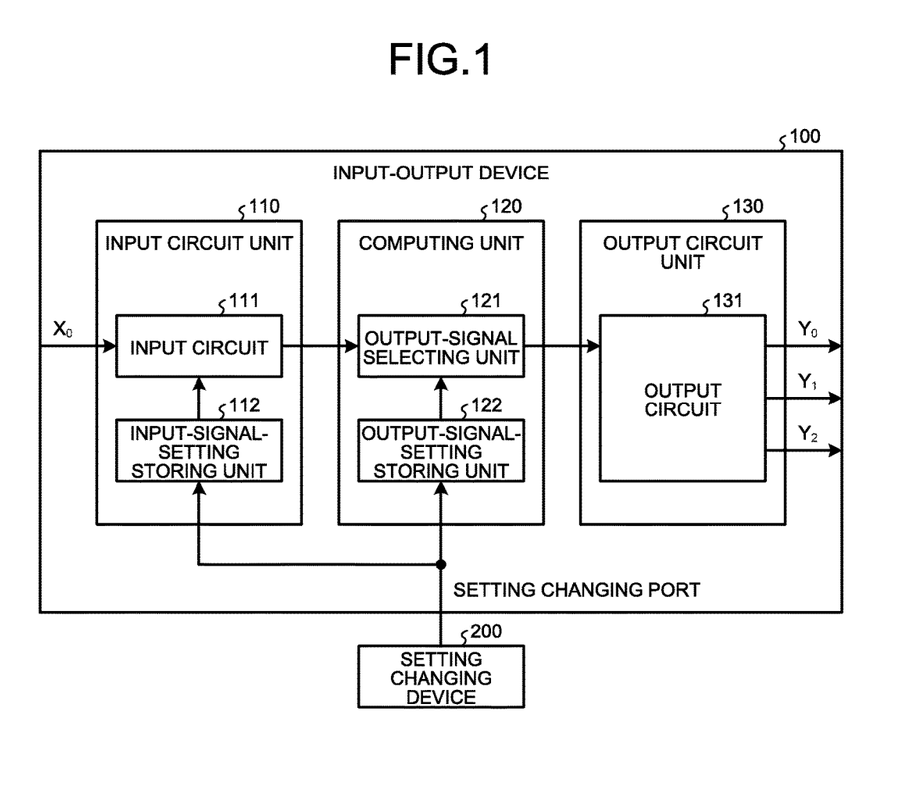
FIG. 1 is a diagram showing the configuration of an input-output device according to a first embodiment of the present invention.

FIG. 1 is a diagram showing the configuration of an input-output device according to a first embodiment of the present invention. An input-output device 100 according to the first embodiment is a device that receives an input signal from an output device connected to an input port $X_0$ and, when the input signal is in an ON state, outputs an output signal to any one of a plurality of input devices connected to a plurality of output ports $Y_0$, $Y_1$, and $Y_2$. The input-output device 100 according to the first embodiment includes an input circuit unit 110 capable of setting a plurality of ON conditions of an input signal, a computing unit 120 capable of setting output conditions, and an output circuit unit 130 that outputs an output signal.

The input circuit unit 110 includes an input-signal-setting storing unit 112 that stores a plurality of conditions of the input signal and an input circuit 111, which is a determining unit that determines whether any one of the ON conditions of the input signal stored in the input-signal-setting storing unit 112 holds.

The computing unit 120 includes an output-signal-setting storing unit 122 that stores information in which the ON conditions of the input signal, output ports for outputting the output signal, and specifications of the output signal are associated and an output-signal selecting unit 121 that generates, on the basis of a determination result of the input circuit 111 and the information stored in the output-signal-setting storing unit 122, an output command indicating the output ports for outputting the output signal and the specifications of the output signal.

The output circuit unit 130 includes an output circuit 131 that outputs, to the output ports indicated by the output command, the output signal according to the specifications indicated by the output command.

The ON conditions of the input signal can be changed by a setting changing device 200 connected to the input-output device 100. Setting contents input from the setting changing device 200 is stored in the input-signal-setting storing unit 112. The ON conditions of the output signal and the specifications of the output signal can be changed by the setting changing device 200 connected to the input-output device 100. Setting contents input from the setting changing device 200 are stored in the output-signal setting storing unit 122. A general computer can be applied to the setting changing device 200.

Note that a plurality of ON conditions of the input signal can be set in the input-signal-setting storing unit 112 by the setting changing device 200. A plurality of output ports for outputting the output signal and a plurality of specifications of the output signal can be set in the output-signal-setting storing unit 122 by the setting changing device 200.

Figure 2:
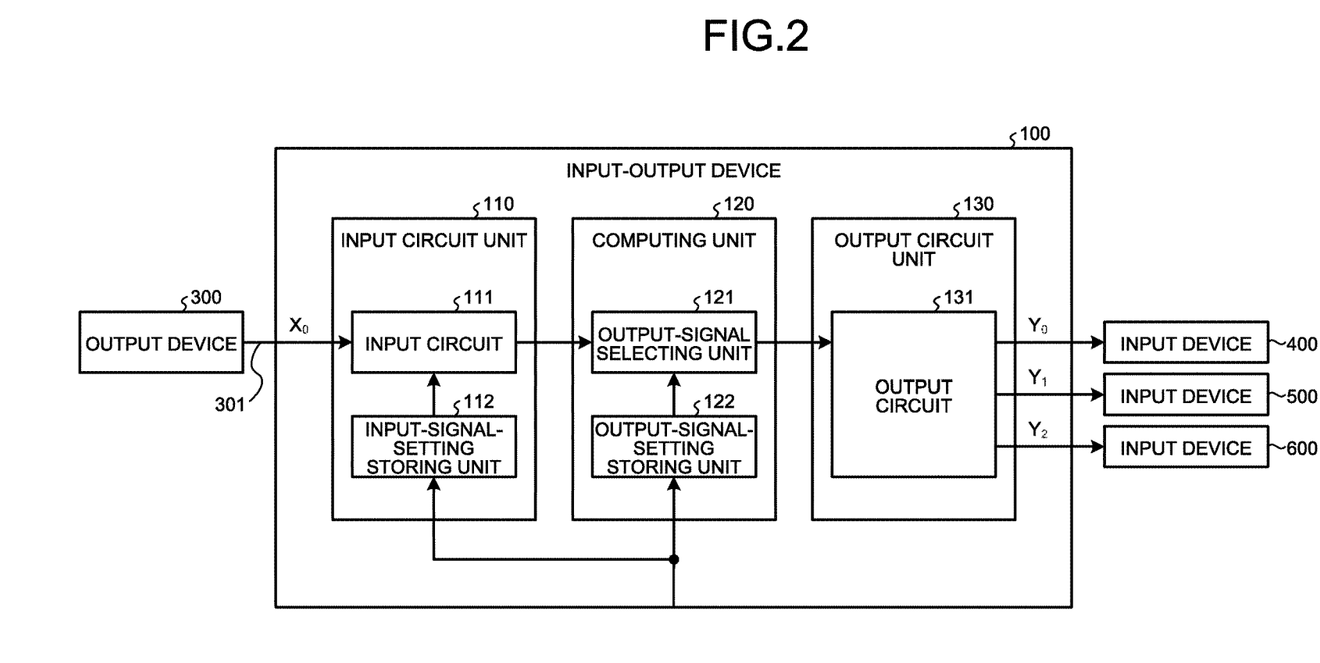
FIG. 2 is a diagram showing a state in which the input-output device according to the first embodiment is connected between an output device and an input device.

FIG. 2 is a diagram showing a state in which the input-output device according to the first embodiment is connected between an output device and an input device. An output device 300 is connected to the input port $X_0$ of the input-output device 100. A signal output to an output signal line 301 by the output device 300 is input to the input-output device 100 from the input port $X_0$. The output device 300 is a device capable of outputting a plurality of signals having different specifications through the output signal line 301. The specifications of the signal are combination patterns of voltage values, current values, and ON times. For example, a plurality of signals having the same current value and the same ON time but having different voltage values are different signals having different specifications. Specific examples of the output device 300 include a tester, a power meter, and an encoder. However, the output device 300 is not limited to these devices.

An input device 400 is connected to the output port $Y_0$ of the input-output device 100. The output signal output by the output circuit 131 is input to the input device 400 through the output port $Y_0$. An input device 500 is connected to the output port $Y_1$ of the input-output device 100. The output signal output by the output circuit 131 is input to the input device 500 through the output port $Y_1$. An input device 600 is connected to the output port $Y_2$ of the input-output device 100. The output signal output by the output circuit 131 is input to the input device 600 through the output port $Y_2$.

Specifications of the signal input to the input devices 400, 500, and 600 are decided for each of the devices. Therefore, specifications of the output signal are set in the output-signal-setting storing unit 122 such that specifications of the output signal output from the output circuit 131 match the input devices 400, 500, and 600. Specific examples of the input devices 400, 500, and 600 include a lamp, a motor, and a relay. However, the input devices 400, 500, and 600 are not limited to these devices.

Only when the ON conditions stored in the input-signal-setting storing unit 112 are satisfied, the input circuit unit 110 detects with the input circuit 111 that the input signal input from the outside through the input port $X_0$ is ON and notifies the computing unit 120 to that effect.

When being notified from the input circuit 111 that the input signal is ON, the computing unit 120 outputs the output command of the output signal to the output circuit 131 according to the setting stored in the output-signal-setting storing unit 122.

In the output command output by the output-signal selecting unit 121, the output port for outputting the output signal and the specifications including the voltage value, the current value, and the ON time of the output signal are defined. The output circuit 131 outputs, according to the output command received from the output-signal selecting unit 121, the output signal having the voltage value, the current value, and the ON time designated by the output command from the output port designated by the output command.

Figure 3:
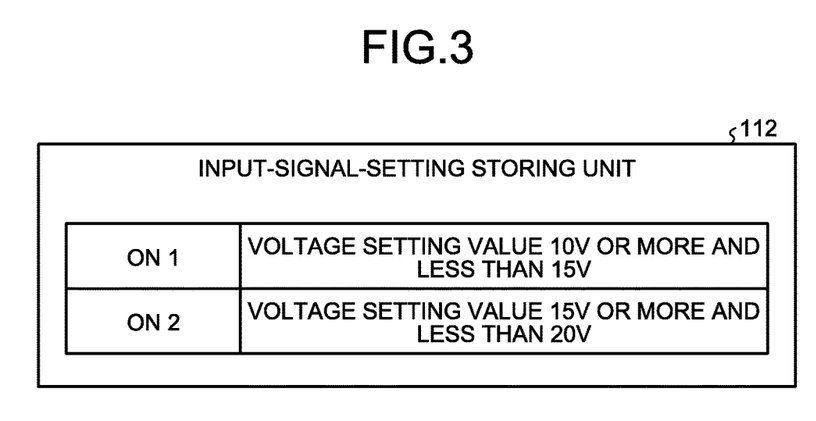
FIG. 3 is a diagram showing ON conditions of an input signal set in the input-output device according to the first embodiment.
Figure 4:
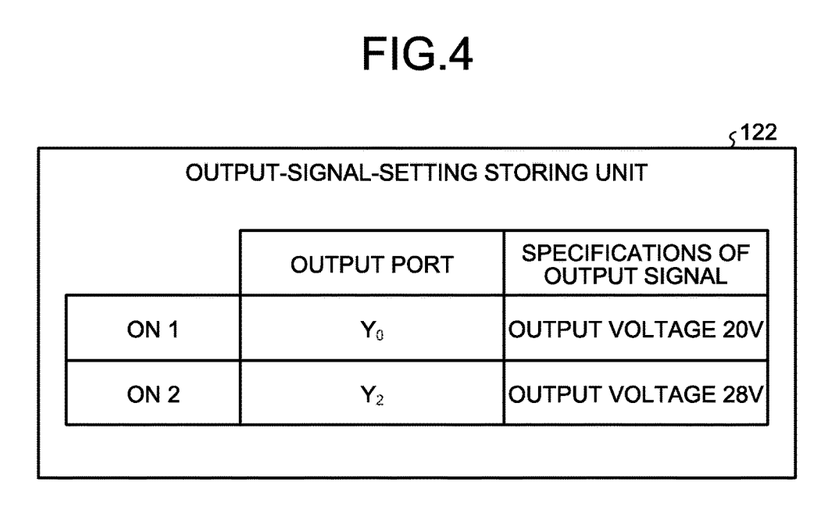
FIG. 4 is a diagram showing ON conditions and specifications of an output signal set in the input-output device according to the first embodiment.

The operation of the input-output device according to the embodiment is explained with reference to a specific example. FIG. 3 is a diagram showing ON conditions of an input signal set in the input-output device according to the first embodiment. FIG. 4 is a diagram showing ON conditions and specifications of an output signal set in the input-output device according to the first embodiment. Two ON conditions of "ON 1" and "ON 2", specifications of which are defined as voltage values, are stored in the input-signal-setting storing unit 112. The ON condition of the ON 1 holds when a voltage value of the input signal input from the input port $X_0$ is 10 volts or more and less than 15 volts. The ON condition of the ON 2 holds when the voltage value of the input signal input from the input port $X_0$ is 15 volts or more and less than 20 volts.

Setting for outputting an output signal having a voltage value of 20 volts from the output port $Y_0$ when the ON condition of the ON 1 holds is stored in the output-signal-setting storing unit 122 Similarly, setting for outputting an output signal having a voltage value of 28 volts from the output port $Y_2$ when the ON condition of the ON 2 holds is stored in the output-signal-setting storing unit 122.

When the input signal is input to the input port $X_0$ of the input-output device 100 in a state in which the setting is made and a voltage of 12 volts is applied to the input port $X_0$, the input circuit 111 notifies, according to the setting stored in the input-signal-setting storing unit 112, the output-signal selecting unit 121 that the input signal satisfies the ON condition of the ON 1. The output-signal selecting unit 121 outputs, according to the setting stored in the output-signal-setting storing unit 122, to the output circuit 131, an output command corresponding to the ON 1 for outputting an output signal having a voltage value of 20 volts from the output port $Y_0$. The output circuit 131 outputs the output signal from the output port $Y_0$ at the voltage value of 20 volts according to the output command received from the output-signal selecting unit 121.

Similarly, when the input signal is input to the input port $X_0$ of the input-output device 100 and a voltage of 18 volts is applied to the input port $X_0$, the input circuit 111 notifies, according to the setting stored in the input-signal-setting storing unit 112, the output-signal selecting unit 121 that the input signal satisfies the ON condition of the ON 2. The output-signal selecting unit 121 outputs, according to the setting stored in the output-signal-setting storing unit 122, to the output circuit 131, an output command corresponding to the ON 2 for outputting an output signal having a voltage value of 28 volts from the output port $Y_2$. The output circuit 131 outputs the output signal from the output port $Y_2$ at the voltage value of 28 volts according to the output command received from the output-signal selecting unit 121.

When the input signal is input to the input port $X_0$ of the input-output device 100 and a voltage of 8 volts is applied to the input port $X_0$, the input circuit 111 does not notify the output-signal selecting unit 121 that the input signal satisfies the ON condition. Therefore, the output signal is not output from all of the output ports $Y_0$, $Y_1$, and $Y_2$.

When the voltage value of the input signal is 8 volts, radiation noise is applied to the output signal line 301 and the input circuit 111 determines that the voltage value of the input signal is 10 volts, the input circuit 111 notifies the output-signal selecting unit 121 that the ON condition of the ON 1 is satisfied. The output-signal selecting unit 121 outputs, to the output circuit 131, the output command for outputting the output signal having the voltage value of 20 volts from the output port $Y_0$ corresponding to the ON condition of the ON 1. The output circuit 131 outputs the output signal from the output port $Y_0$ at the voltage value of 20 volts according to the output command. Therefore, in the input-output device 100, although the input signal does not satisfy the ON condition, malfunction occurs in which the output signal having the voltage value of 20 volts is output.

In such a case, by changing the ON condition of the ON 1 stored in the input-signal-setting storing unit 112 from 10 volts or more and less than 15 volts to 12 volts or more and less than 15 volts, it is possible to prevent the input-output device 100 from malfunctioning when the output voltage of the signal output from the output device 300 to the output signal line 301 is 8 volts.

In the example explained above, the ON conditions of the input signal and the specifications of the output signal are defined by the voltage values. However, a plurality of ON conditions of the input signal can also be defined in the input-signal-setting storing unit 112 by differentiating current values or ON times. Further, by defining the specifications of the output signal in the output-signal-setting storing unit 122 according to combinations of the voltage values, the current values, and the ON times, it is easy to increase types of output signals compared with when the specifications of the output signal are defined by a single setting value. Even when the ON conditions of the input signal are defined by the combinations of the voltage values, the current values, and the ON times, it is unnecessary to provide input ports as many as the combinations and connect the output device to the input ports.

Note that the number of output signals controlled by an input signal input to one input port can also be set to be equal to or larger than the number of output ports. That is, by setting ON conditions of the input signal larger in number than the number of output ports in the input-signal-setting storing unit 112, it is possible to set the types of output signals to be more than the number of output ports. That is, by outputting output signals having different specifications from the same output port on the basis of the types of the ON conditions of the input signal, it is possible to set the number of output signals to be equal to or larger than the number of output signal lines.

In this way, the input-output device 100 according to the first embodiment is capable of changing the ON conditions of the input signal. Therefore, when the output device connected to the input port is changed, it is possible to cope with the output device after the change only by changing the ON conditions. The ON conditions can be set not to erroneously determine because of the radiation noise that the input signal is in the ON state.

The output signal can be selected according to the difference of the ON conditions of the input signal. Therefore, it is unnecessary to set output ports adjusted to the ON conditions of the input signal.

In a plurality of output signals, it is possible to control ON and OFF for each of the ON conditions of the input signal. Therefore, only by checking an output state of the input-output device 100, it is possible to check which ON condition of the input signal holds.

Because a condition for turning on or off the output signal can be changed, it is possible to set conditions adjusted to devices to which the output ports are connected. It is unnecessary to change the input device involved in the change of the conditions.

Second Embodiment

Figure 5:
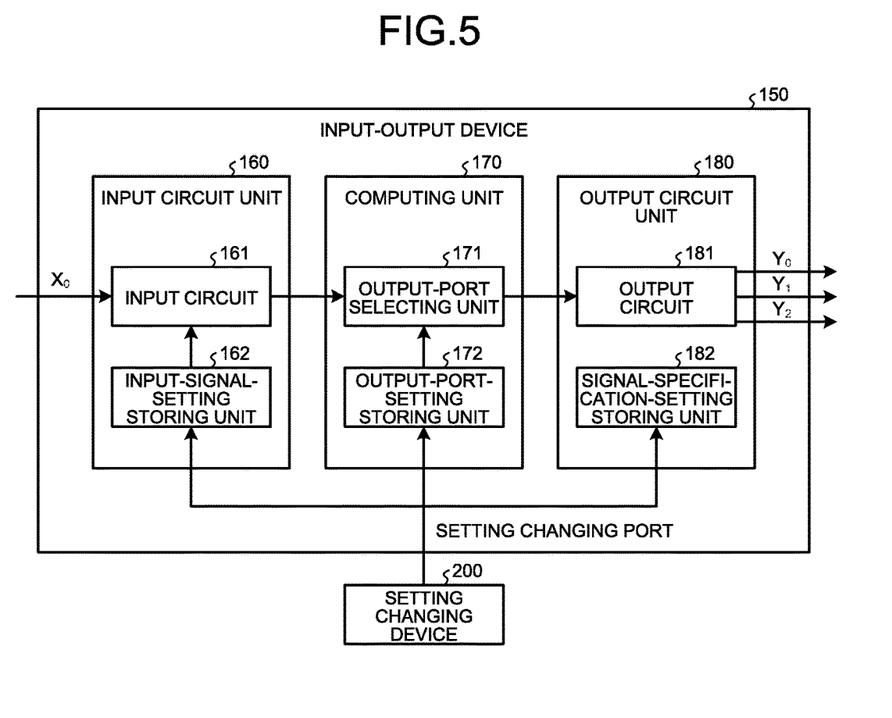
FIG. 5 is a diagram showing the configuration of an input-output device according to a second embodiment of the present invention.

FIG. 5 is a diagram showing the configuration of an input-output device according to a second embodiment of the present invention. A computing unit 170 of an input-output device 150 according to the second embodiment includes an output-port-setting storing unit 172 that stores information in which ON conditions of an input signal and output ports for outputting an output signal are associated and an output-port selecting unit 171 that generates, on the basis of a determination result of an input circuit 161 and the information stored in the output-port-setting storing unit 172, an output command indicating the output ports for outputting the output signal. An output circuit unit 180 of the input-output device 150 includes a signal-specification-setting storing unit 182 that stores information in which specifications of the output signal are decided for each of the plurality of output ports and an output circuit 181 that outputs, to the output ports indicated by an output command, the output signal according to the specifications based on the information stored in the signal-specification-setting storing unit 182.

An input circuit unit 160, the input circuit 161, and an input-signal-setting storing unit 162 are the same as the input circuit unit 110, the input circuit 111, and the input-signal-setting storing unit 112 of the input-output device 100 according to the first embodiment. The setting changing device 200 is the same as the setting changing device 200 in the first embodiment.

The ON conditions of the input signal can be changed by the setting changing device 200 connected to the input-output device 150. Setting contents input from the setting changing device 200 are stored in the input-signal-setting storing unit 162. The ON conditions of the output signal can be changed by the setting changing device 200 connected to the input-output device 150. The setting contents input from the setting changing device 200 are stored in the output-port-setting storing unit 172. The specifications of the output signal can be changed by the setting changing device 200 connected to the input-output device 150. The setting contents input from the setting changing device 200 are stored in the signal-specification-setting storing unit 182.

Note that a plurality of ON conditions of the input signal can be set in the input-signal-setting storing unit 162 by the setting changing device 200. A plurality of output ports for outputting the output signal can be set in the output-port-setting storing unit 172 by the setting changing device 200. A plurality of specifications of the output signal can be set in the signal-specification-setting storing unit 182 by the setting changing device 200.

Figure 6:
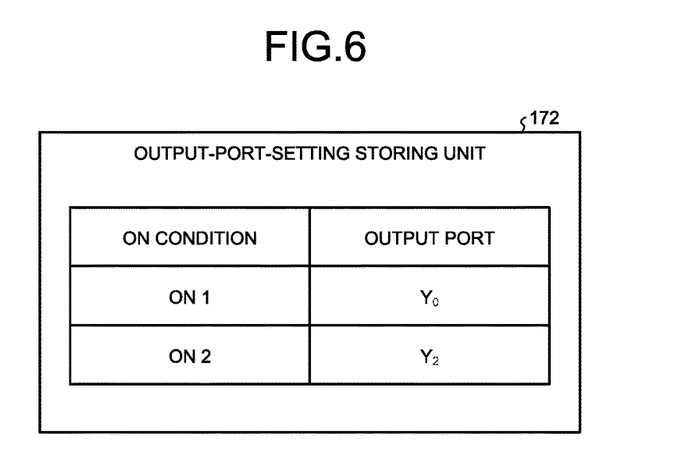
FIG. 6 is a diagram showing ON conditions of an output signal set in the input-output device according to the second embodiment.
Figure 7:
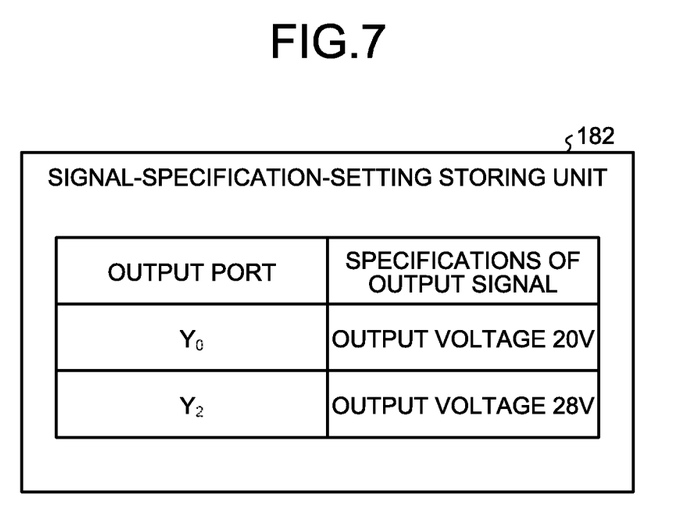
FIG. 7 is a diagram showing specifications of the output signal set in the input-output device according to the second embodiment.

The operation of the input-output device according to the embodiment is explained with reference to a specific example. FIG. 6 is a diagram showing ON conditions of the output signal set in the input-output device according to the second embodiment. FIG. 7 is a diagram showing specifications of the output signal set in the input-output device according to the second embodiment. It is assumed that setting stored in the input-signal-setting storing unit 162 is the same as the contents stored in the input-signal-setting storing unit 112 in the first embodiment. That is, the ON condition of the ON 1 holds when a voltage value of the input signal input from the input port $X_0$ is 10 volts or more and less than 15 volts. The ON condition of the ON 2 holds when the voltage value of the input signal input from the input port $X_0$ is 15 volts or more and less than 20 volts.

Setting for outputting the output signal from the output port $Y_0$ when the ON condition of the ON 1 holds is stored in the output-port-setting storing unit 172. Similarly, setting for outputting the output signal from the output port $Y_2$ when the ON condition of the ON 2 holds is stored in the output-port-setting storing unit 172.

Setting for setting the voltage value of the output signal from the output port $Y_0$ to 20 volts is stored in the signal-specification-setting storing unit 182. Setting for setting the voltage value of the output signal from the output port $Y_1$ to 25 volts is stored in the signal-specification-setting storing unit 182. Setting for setting the voltage value of the output signal from the output port $Y_2$ to 28 volts is stored in the signal-specification-setting storing unit 182.

When the input signal is input to the input port $X_0$ of the input-output device 150 and a voltage of 12 volts is applied to the input port $X_0$ in a state in which the setting explained above is made, the input circuit 161 notifies, according to the setting stored in the input-signal-setting storing unit 162, the output-port selecting unit 171 that the input signal satisfies the ON condition of the ON 1. The output--port selecting unit 171 outputs, according to the setting stored in the output-port-setting storing unit 172, to the output circuit 181, an output command for outputting the output signal from the output port $Y_0$ corresponding to the ON condition of the ON 1. The output circuit 181 outputs the output signal from the output port $Y_0$ at the voltage value of 20 volts according to the setting stored in the signal-specification-setting storing unit 182.

Similarly, when the input signal is input to the input port $X_0$ of the input-output device 150 and a voltage of 18 volts is applied to the input port $X_0$, the input circuit 161 notifies, according to the setting stored in the input-signal-setting storing unit 162, the output-port selecting unit 171 that the input signal satisfies the ON condition of the ON 2. The output-port selecting unit 171 outputs, according to the setting stored in the output-port-setting storing unit 172, to the output circuit 181, an output command for outputting the output signal from the output port $Y_2$ corresponding to the ON condition of the ON 2. The output circuit 181 outputs the output signal from the output port $Y_2$ at the voltage value of 28 volts according to the setting stored in the signal-specification-setting storing unit 182.

When the input signal is input to the input port $X_0$ of the input-output device 150 and a voltage of 8 volts is applied to the input port $X_0$, the input circuit 161 does not notify the output-port selecting unit 171 that the input signal satisfies the ON conditions. Therefore, the output signal is not output from all of the output ports $Y_0$, $Y_1$, and $Y_2$.

In the second embodiment, two different output signals cannot be output from one output port. However, compared with the first embodiment, because an information amount set in the computing unit is small, it is possible to reduce a load of the computing unit.

The configurations explained in the embodiments indicate examples of the contents of the present invention. The configurations can be combined with other publicly-known technologies. A part of the configurations can be omitted or changed in a range not departing from the spirit of the present invention.

REFERENCE SIGNS LIST 100, 150 input-output device
110, 160 input circuit unit
111, 161 input circuit
112, 162 input-signal-setting storing unit 120, 170 computing unit
121 output-signal selecting unit
122 output-signal-setting storing unit
130, 180 output circuit unit
181, 181 output circuit
171 output-port selecting unit
172 output-port-setting storing unit
182 signal-specification-setting storing unit
200 setting changing device
300 output device
301 output signal line
400, 500 600 input device

The invention claimed is:

1. An input-output device that receives an input signal from an output device connected to an input port and, when the input signal is in an ON state, outputs an output signal to any one of a plurality of input devices connected to a plurality of output ports, the input-output device comprising:
an input circuit including an input-signal-setting storage device to store a plurality of ON conditions of the input signal and a determining circuit to determine whether any one of the ON conditions of the input signal stored in the input-signal-setting storage device holds;
an arithmetic circuit including an output-signal-setting storage device to store information in which the ON conditions of the input signal, the output ports for outputting the output signal, and specifications of the output signal are associated and an output-signal selector to generate, on the basis of a determination result of the determining circuit and the information stored in the output-signal-setting storage device, an output command indicating the output ports for outputting the output signal and the specifications of the output signal; and
an output circuit to output, to the output ports indicated by the output command, the output signal according to the specifications indicated by the output command.

2. The input-output device according to claim 1, wherein the ON conditions of the input signal stored in the input-signal-setting storage device and the information stored in the output-signal-setting storage device can be changed.

3. An input-output device that receives an input signal from an output device connected to an input port and, when the input signal is in an ON state, outputs an output signal to any one of a plurality of input devices connected to a plurality of output ports, the input-output device comprising:
an input circuit including an input-signal-setting storage device to store a plurality of ON conditions of the input signal and a determining circuit to determine whether any one of the ON conditions of the input signal stored in the input-signal-setting storage device holds;
an arithmetic circuit including an output-port-setting storage device to store information in which the ON conditions of the input signal and the output ports for outputting the output signal are associated and an output-port selector to generate, on the basis of a determination result of the determining circuit and the information stored in the output-port-setting storage device, an output command indicating the output ports for outputting the output signal;
a signal-specification-setting storage device to store information in which the specifications of the output signal are decided for each of the plurality of output ports; and
an output circuit to output, to the output ports indicated by the output command, the output signal according to the specifications based on the information stored in the signal-specification-setting storage device.

4. The input-output device according to claim 3, wherein the ON conditions of the input signal stored in the input-signal-setting storage device, the information stored in the output-port-setting storage device, and the information stored in the signal-specification-setting storage device can be changed.

\* \* \* \* \*